United States Patent

[11] 3,574,329

| [72] | Inventor | David K. Beavon |
| | | Long Beach, Calif. (702 S. Serrano 12 |
| | | Los Angeles, Calif. 90005) |
| [21] | Appl. No. | 861,633 |
| [22] | Filed | Sept. 29, 1969 |
| [45] | Patented | Apr. 13, 1971 |

[54] PROCESS FOR PURIFYING WATER CONTAINING OIL AND SOLIDS
10 Claims, 1 Drawing Fig.

[52] U.S. Cl. .......................................... 210/80,
210/275
[51] Int. Cl. ........................................ B01d 23/24
[50] Field of Search ............................ 210/23, 40,
73, 80, 32, 275

[56] References Cited
UNITED STATES PATENTS
| 1,769,475 | 7/1930 | Teitsworth ................... | 210/80 |
| 2,549,063 | 4/1951 | De Haven ..................... | 210/23 |
| 2,785,123 | 3/1957 | Stroud ........................ | 210/40X |

*Primary Examiner*—John Adee
*Attorney*—Christie, Parker and Hale

ABSTRACT: Water containing oil and particulate solids, typically oil-wet solids, is filtered through a filter media, such as a sand, to retain particulate solids thereby yielding clear water or a mixture of solids-free oil and water, which will readily separate by gravity. The filter media is periodically regenerated by steam stripping to remove retained oil, then backwashed to remove oil-free particulate solids.

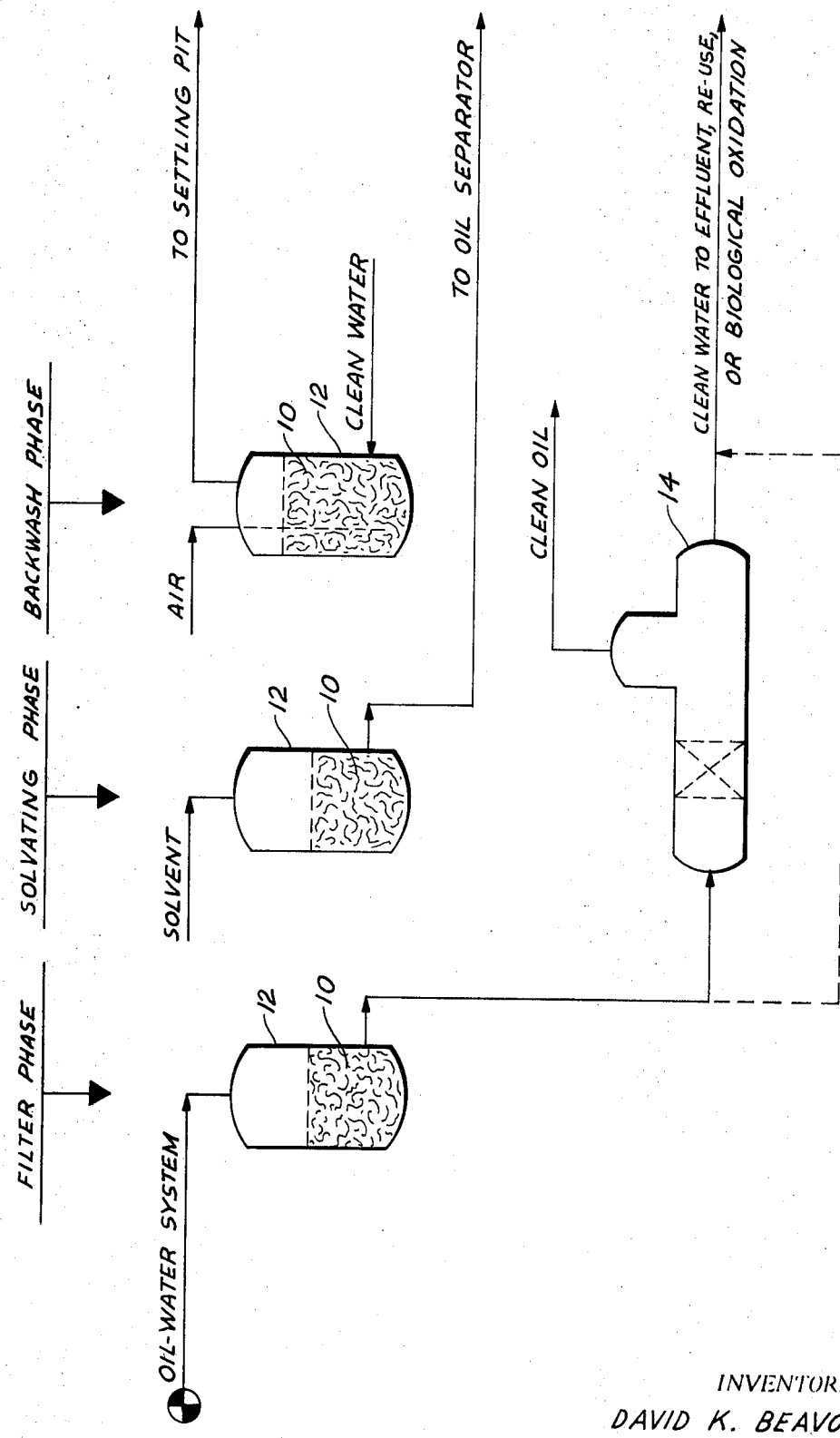

PROCESS FOR PURIFYING WATER CONTAINING OIL AND SOLIDS

BACKGROUND OF THE INVENTION

The present invention relates to a method for treating oily water to remove oils and particulate matter therefrom.

In the petroleum and allied industries it is common to encounter dispersions of oil in water systems from which the oil must be removed essentially completely to permit the water to be reused or discarded without causing pollution.

A first step in oil removal is normally gravity settling, in which the system is allowed to flow slowly through a settling chamber with the oil rising to form a separable layer which is periodically decanted from the water layer. Gravity settling, however, is usually inadequate to completely deoil the water. The main impediment is the presence of finely divided solids in the dispersions. In petroleum refining, for instance, solids are usually oil-wet and may be earthy or precipitates, such as calcium carbonate, calcium sulfate or iron sulfide. These solids resist agglomeration and, because they have a specific gravity close to water, show little tendency to rise with the oil from the water. Further, their mobility and coalescing tendencies are poor.

Consequently, it has been necessary to reprocess water after gravity settling by flocculation and sedimentation or air flotation with or without flocculation. Flocculation and sedimentation involve the addition of a floc-producing chemical, such as alum, to the water to produce a floc which entraps particles of oily solids which settle to the bottom of a chamber from which clarified water is decanted. The oily floc presents a disposal problem. Normally it is thickened, separated by filtration and incinerated.

An alternative is to dissolve a gas under pressure, then release the pressure and allow the gas bubbles to float oily droplets to the surface where they may be decanted. Frequently, however, clarification of the water may only be achieved with the additional presence of a flocculant. In this instance, the floc is floated and eventually disposed of in the same manner as sedimented floc. Both methods are costly and inefficient, but are used almost universally because better methods have not yet be devised, despite the Committee on Waste Disposal of the American Petroleum Institute having generously sponsored developments in this area for many years.

SUMMARY OF THE INVENTION

Clarified water may be obtained at low cost from an oil-water system containing particulate solids by passing the system through a granular filter media sufficiently fine to entrap the solid particles and obtain clear water of a solids-free mixture of oil and water which will separate into sharply defined layers of oil and water, leaving thereby a filter cake which is periodically regenerated by solvating oil from the filter media without affecting the cake integrity, then backwashing the oil-freed particulate solids with water with the possible assistance of a gas to obtain as separate recoverable or discardable net constituents; water, oil and oil-free particulate solids.

DRAWING

The attached Drawing is a schematic illustration of the several phases which comprise a method to carry out the process of this invention.

DESCRIPTION

According to the present invention, an oil-water system containing particulate solids, typically oil-wet solids, is processed to obtain clarified water, oil and an oil-free particulate solids residue by the general steps of filtering the particulate solids from an oil-water system to obtain either clarified water or a readily separable oil-water mixture and entrained solids which are recovered by stripping the filter media of oil, then backwashing the solids from the filter media to regenerate the filter bed.

With reference now to the Drawing, which illustrates a gravity-aided separation, the first phase of the invention involves separation of solids, normally oil-wet solids, from an oil-water mixture. In this Filter Phase the oil-water system is passed through a filter media 10 which will retain the solids contained in the oil-water system. For a typical oil-water system the filter media 10 is normally contained in a pressure vessel 12 to allow forced flow of the oil-water system therethrough. Although forced flow is desirable under modern processing conditions, it is to be understood that gravitation separation is also within the ambit of this invention.

The effluent from the oil-water system filtration phase is either clarified water of a mixture of water and oil which will readily separate into a water phase and oil phase in separator 14. The oil is withdrawn from the top as clean oil and water withdrawn from the base and passed directly to effluent or a biological oxidation system.

The oil-water system treated in the Filter Phase may be obtained directly from any process source, such as petroleum refinery streams, oil purification streams, vegetable and oil processing streams, rolling mill streams from steel mills and like processes where there is formed an oil-water system containing particulate solids, usually oil-wet solids. The solids may vary from ordinary earth residues to more sophisticated salts, corrosive entrainments and processing byproducts. Being generally oil-wet, they retard fine separation of oil from water. To remove their impedimentary nature, filtration, in accordance with the practice of this invention, removes them and allows water in an oil-water system to be readily reconstituted for reuse or disposal without fear of pollution. As indicated, either clarified water or an oil-water mixture free of solids is the effluent from this phase. If a mixture of oil and water is obtained, it will separate into sharply defined water and oil layers as the solids, which impede separation, have been effectively removed.

The nature of the filter media 10 is not narrowly critical. Generally, it is composed of particles of a size which will yield a bed destined to retain the particulate solids, resolve emulsions and coalesce oil which allowing water, with or without oil, to flow therethrough. For most oil-water systems a filter bed of a media having a particle size from about 0.1 to about 5 mm. in average diameter may be expected to adequately entrain essentially all of the particulate solid matter contained in the process stream. Finer sized filter media may be used for extremely fine particulate matter in a process stream. The filter media particle size may be conveniently varied by building layers of increasing particle size to generally provide, in a direction opposed or concurrent with the flow of the oil-water system, to promote gradient filtration.

The nature of the media which comprises the filter bed is not narrowly critical, although it should be resistant to the solvating action of the oil extract and used in the subsequent filter bed regeneration. Examples of media, which may be used in accordance with the practice of this invention, are sand, particulate or crushed coal, finely divided polymeric materials, finely divided carbon, such as coke, glass beads, sintered metal and the like, of a size which will provide a free path for the flow of water, with or without oil, while resisting the flow or particulate matter contained in the oil-water system. The use of sand or a combination of sand and particulate coal is preferred, with a combination of sand and particulate coal particularly preferred for treatment of a highly loaded system as it will naturally separate into coal and sand layers which offer a combination of coarse and fine filter medias.

There will, of course, be some resistance to the flow which will increase with particulate solids entrainment. There will, therefore, be some pressure differential between outlet pressure and inlet pressure. For a newly formed or regenerated bed it has been observed that substantial retention of particulate solids contained in an oil-water system may be achieved at a pressure drop through the filter bed as low as about 1 p.s.i.g., but that with operation, pressure, which must be applied to maintain desirable transport, will increase with bed loading. Generally, for efficient operation throughput of water or oil and water should be in the order of about 2 to about 10 g.p.m. per square foot of bed surface area and in the instance of downward flow as aided by gravity preferably from about 2 to about 5 g.p.m. per square foot of bed surface area.

Actual pressure of operation will depend on the nature of the oil-water system being processed with particular emphasis on the end use of the water, as this determines the net lower operating pressure for the system. Normally, however, when pressure drop through the filter media exceeds about 20 p.s.i., it has been observed that the bed has reached maximum solids entrainment and must be regenerated for reuse.

With reference to the Oil Solvating Phase of the Drawing, this is accomplished generally by discontinuing input, allowing free fluids to drain, then stripping entrained oil from the filter, without disrupting entrained solids, using a stripping media, normally steam or an organic solvent, for the oil. This is accomplished by duplicating the direction flow of the oily process water. Where steam, the preferred oil extractant, is used, oil will be removed without disturbing the collected solids by the general combined actions involving steam distillation of the more volative oils and steam heating of oils to reduce viscosity and thereby cause flow and preferential displacement of oil. The solids remaining are oil free and water wet. Steaming is preferably carried out at temperatures of from about 212° to about 350° F. at as low a pressure as can be convenient to the system.

When an organic solvent for the oil is used, it should not display a solvating action towards the entrained solids and should have a sufficiently high vapor pressure to allow the bed to free itself of vapors prior to removal of oil free particulate solids. Normal petroleum distillates, such as petroleum naphtha, may be effectively used to remove oil without disturbing solids entrained in the bed. As with steam stripping, the oil solvent is passed through the filter media in the same direction of flow as the oily water.

When the bed has been stripped of oil, the entrained oil-free solids are removed by backwashing with water. With reference now to the Backwash Phase of the Drawing, this is accomplished generally by passing water through the filter media in a direction countercurrent to the normal flow of the oil-water system. As illustrated in the Drawing, this is shown as an upward flow accompanied by aeration for the situation when the oil-water system has been passed downwardly through the filter bed. The rate of water flow is not narrowly critical but should be sufficient to agitate the filter media particles and release therefrom the oil-free particulate solids. Generally, water flow may vary from about 3 to about 15 g.p.m. per square foot of bed surface area. As it is important to clean the filter bed thoroughly, the bed is preferably agitated with air while flooding with water, either before or during backwashing. The resulting mixture of backwash water and solids, and air, if present, are then removed to a settling pond where solids are recovered by sedimentation. Clean sedimentation occurs because oil is not present. After backwashing, the filter bed is ready for reuse to further filter an oil-water system.

Since the sequence of filtering, steaming and backwashing may be repeated indefinitely, and since it may be desired to operate the filter continuously, it is preferred to operate two or more filters in parallel, one or more filters being used to filter oily solids from the oil-water process stream while one or more filters are being regenerated.

The recovered water, either directly from the filter or after subsequent gravity separation, is normally returned to the system for reuse or oxidized biologically in a surface aerated pond before disposal to waste.

It is also within the ambit of this invention to aid filtering of oily particulate matter from an oil-water system by the addition of a coagulating agent to the oil-water system. Coagulating agents are those which serve to agglomerate oil particles and oily solids and are normally polyelectrolytes, such as acrylamide polymers. Because the filter media, however, serves a prime function for solids retention, the amount of coagulating agent required will be substantially less than employed in prior art systems. The particular advantages offered by the practice of this invention are water clarification with reduction of entrained oil to values of 10 parts per million or less and essentially complete removal of solids. The practice of this invention also affords production of dry oil, free of emulsions, and the production of solids substantially free of oil content suitable for disposal without further processing. The system may be further constructed and operated at costs substantially less than the cost of constructing and operating prior separation systems.

EXAMPLE

It has been found that, using a sand media as a filter and filtering in a downward direction to a bed, as illustrated in the Drawing, clear water, containing less than 10 parts per million free oil and essentially no solids, has been consistently obtained from an oily feed of a crude contaminated brine from a crude oil desalter containing oily condensates from a petroleum refinery. The filtered water, when oxidized biologically in a surface aerated pond, was found to support fish life without difficulty. When the sand media was steamed and backwashed, the solids obtained were essentially free of oil and settled rapidly in water for disposal by burial without causing pollution.

I claim:
1. A process for treating oil-water systems to produce clarified water, solids-free oil and oil-free solids which comprises:
   a. filtering an oil-water system containing particulate solids through a granular filter media sufficiently fine to retain said particulate solids and pass an effluent free of solids, said effluent selected from the group consisting of water and a mixture of water and oil;
   b. periodically solvating oil from said filter media by passing an oil stripping media through said filter media in the same direction as said oil-water system to form a filter media containing retained oil free particulate solids and solids-free oil; and
   c. thereafter, backwashing said media in a direction countercurrent to the flow of said oil-water system and said oil stripping media to extract said retained oil free particulate solids from said filter media.

2. A process as claimed in claim 1 in which the oil-water system is fed to said filter media at a rate of from about 2 to about 10 gallons per minute per square foot of filter media surface area.

3. A process as claimed in claim 2 in which the oil-water system is fed downwardly through said filter media.

4. A process as claimed in claim 1 in which oil is periodically solvated from said filter media using steam.

5. A process as claimed in claim 1 in which oil is periodically solvated from said filter media using an organic solvent for said oil.

6. A process as claimed in claim 1 in which the filter media is backwashed with water.

7. A process as claimed in claim 6 in which the filter media is backwashed at a water-flow rate of from 3 to about 15 gallons per minute per square foot of filter media surface area.

8. A process as claimed in claim 1 in which backwashing is assisted by aeration.

9. A process as claimed in claim 1 in which the filter media comprises particles having an average particle size of from about 0.1 to about 5 mm. in diameter.

10. A process as claimed in claim 1 in which the filter media is selected from the group consisting of sand, particulate coal and mixtures thereof.

PO-1050
(5/69)

UNITED STATES PATENT OFFICE
CERTIFICATE OF CORRECTION

Patent No. 3,574,329　　　　　　　Dated　April 13, 1971

Inventor(s)　　David K. Beavon

It is certified that error appears in the above-identified patent and that said Letters Patent are hereby corrected as shown below:

At Column 1, line 42, the word "be" should be --been--.

At Column 2, line 15, the word "of" should be --or--.

At Column 2, line 64, the word "or" should be --of--.

Signed and sealed this 10th day of August 1971.

(SEAL)
Attest:

EDWARD M. FLETCHER, JR.　　　　　　　WILLIAM E. SCHUYLER, JR.
Attesting Officer　　　　　　　　　　Commissioner of Patents